United States Patent [19]

Jackson

[11] 3,943,041
[45] Mar. 9, 1976

[54] METHOD OF PRODUCING TANTALUM CAPACITORS

[75] Inventor: Norman Frank Jackson, Duston, England

[73] Assignee: Plessey Handel und Investments A.G., Zug, Switzerland

[22] Filed: Jan. 9, 1975

[21] Appl. No.: 539,803

[30] Foreign Application Priority Data

Feb. 12, 1974 United Kingdom............ 06275/74

[52] U.S. Cl............................................. 204/56 R
[51] Int. Cl.²..................................... C25D 11/26
[58] Field of Search.............................. 204/56 R

[56] References Cited
FOREIGN PATENTS OR APPLICATIONS

| 871,844 | 7/1961 | United Kingdom............ 204/56 R |
| 235,522 | 1/1969 | U.S.S.R............................ 204/56 R |

*Primary Examiner*—R. L. Andrews
*Attorney, Agent, or Firm*—Fleit & Jacobson

[57] ABSTRACT

A method of producing a tantalum capacitor wherein the tantalum anode of the capacitor is anodised in an electrolyte which is maintained at a temperature of not greater than 25°C, the value of the anodising current density being selected so that heat dissipation is minimised and the electrolyte concentration is maintained.

10 Claims, No Drawings

METHOD OF PRODUCING TANTALUM CAPACITORS

The invention relates to a method of producing tantalum capacitors.

It has been found that during the production of tantalum capacitors when the tantalum anodes are being anodised by conventional techniques, small crystals of oxide nucleate within the normally amorphous anodic film which is formed on the surface of the anode during the anodising process. When the tantalum capacitors are subsequently used, these crystalline elements can grow radially and thereby displace the amorphous oxide from the surface of the anode. This process of field crystallization, which is enhanced at high voltages and high temperatures, results in a severe degradation of the dielectric properties of the capacitors. In particular, the capacitance value decreases and the dissipation factor and leakage current increase.

The invention provides a method of producing a tantalum capacitor which includes the steps of providing a tantalum anode; and anodising the tantalum anode in an electrolyte which is maintained at a temperature of not greater than 25°C, the value of the anodising current density being selected so that heat dissipation is minimized and the electrolyte concentration is maintained. The tantalum anode can be a sintered powder anode or a foil type anode and the electrolyte can for example be composed of an aqueous phosphate solution such as an aqueous solution of phosphoric acid. There are many other electrolytes which could be used, for example, aqueous solutions of sulphuric acid, sodium sulphate, oxalic acid or citric acid. The tantalum capacitors produced by the method can be of any type.

The foregoing and other features according to the invention will be better understood from the following description of specific embodiments of the invention.

It has been found that the number of crystalline areas that are, as previously stated, formed during the operation of any of the known types of tantalum capacitors can be minimized by producing the capacitors by the method according to the present invention.

In the method according to the present invention the tantalum anodes for the capacitors which can be formed by tantalum foil or be in the form of a sintered powder body are anodised in an electrolyte which is maintained at a temperature of not greater than 25°C during the anodising process, the value of the anodising current density being as high as possible within the limitations imposed by heat dissipation and the necessity to restrain changes in the concentration of the electrolyte. The anodising current density considerations are especially important when dealing with sintered tantalum powder anodes.

A typical electrolyte which can be used is composed of an aqueous phosphate solution such as an aqueous solution of phosphoric acid. There are of course many other electrolytes which could be used, for example, aqueous solutions of sulphuric acid, sodium sulphate, oxalic acid and citric acid. Also, any one of these electrolyte formulations can contain glycol.

The influence of the anodising conditions of the method according to the invention on the degree of field crystallization for 70 volt tantalum foil capacitors after storage for 150 hours at a temperature of 85°C with the rated voltage applied is given in the following table.

| Anodising Temperature (°C) | Anodising Current Density (mA cm$^{-1}$) | Crystalline Area (%) |
|---|---|---|
| 20 | 0.1 | <0.1 |
|  | 2.0 | <0.1 |
| 85 | 0.1 | 14.8 |
|  | 2.0 | 0.5 |

These capacitors utilized tantalum foil anodes and the tantalum foils were anodised to the same thickness, i.e. 2000A, in an aqueous solution of 1% phosphoric acid using the different temperature and current density conditions given in the above table. The capacitors were filled with 2% nitric acid and polarized at a temperature of 85°C for 150 hours with 70 volts applied.

It can, therefore, be seen from the above table that the anodising steps of the method according to the present invention should generally be effected at a low temperature and a high current density. These conditions are diametrically opposite to those that are conventionally employed.

Thus, in a preferred method according to the invention the electrolyte should be composed of an aqueous solution of 5% phosphoric acid and should be maintained at a temperature of 25°C. The current density of anodisation should be in the range 0.1 to 10.0 mA cm$^{-2}$. The lower end of this current density range would be used for sintered tantalum powder electrodes while the upper end of the range would be used for tantalum foil electrodes.

In further tests performed with 125 volt tantalum capacitors which were produced by the method according to the invention to the same nominal capacitance value of 30μF and which employ sintered powder anodes and contain a working electrolyte composed of 40% sulphuric acid, the capacitors where stored at a temperature of 85°C with the rated voltage of 125 volts applied and the resulting leakage current versus storage period characteristics of the capacitors produced at anodisation temperatures of 25°C and 85°C are given in the following table.

| Anodisation Temperature (°C) | Leakage Current at 85°C (μA) | | | | | | | | |
|---|---|---|---|---|---|---|---|---|---|
|  | Time of Storage (Hr) | | | | | | | | |
|  | 50 | 210 | 300 | 420 | 500 | 820 | 1040 | 1340 | 1660 |
| 25 | 1.7 | 3.5 | 4.5 | 6.0 | 9.0 | 11.5 | 17.5 | 28.5 | 44.5 |
| 85 | 2.2 | 14 | 24 | 32 |  |  |  |  |  |

The sintered porous anodes of the 125 volt tantalum capacitors were anodised in an electrolyte composed of an aqueous solution of 1% phosphoric acid and glycol to a concentration of 50 percent, the electrolyte being maintained at the different anodisation temperature conditions given in the above table. The current densities of anodisation and the form down times were similar for both cases, the current densities being approximately 0.1mA cm$^{-2}$.

It can, therefore, be seen from the above table that tantalum capacitors produced by the method according to the invention can be stored over considerably longer periods than tantalum capacitors produced by known methods.

It is to be understood that the foregoing description of specific examples of this invention is made by way of example only and is not to be considered as a limitation in its scope.

What is claimed is:

1. A method of producing a tantalum capacitor which includes the steps of providing a tantalum anode and anodising the tantalum anode in an electrolyte which is maintained at a temperature of not greater than 25°C, the value of the anodising current density being selected so that heat dissipation is minimised and the electrolyte concentration is maintained.

2. A method as claimed in claim 1 wherein the electrolyte is composed of an aqueous phosphate solution.

3. A method as claimed in claim 2 wherein the aqueous phosphate solution is an aqueous solution of phosphoric acid.

4. A method as claimed in claim 3 wherein the anode is composed of tantalum foil, wherein the tantalum foil is anodised in an aqueous solution of 1% phosphoric acid maintained at a temperature of 20°C and wherein the anodising current density is in the range 0.1 to 10.0mA cm$^{-2}$.

5. A method as claimed in claim 1 wherein the electrolyte is composed of an aqueous solution of any one of the acids selected from the group consisting of sulphuric acid, oxalic acid and citric acid.

6. A method as claimed in claim 1 wherein the electrolyte is composed of an aqueous solution of sodium sulphate.

7. A method as claimed in claim 1 wherein the electrolyte includes glycol.

8. A method as claimed in claim 1 wherein the anode is a sintered powder anode, wherein the electrolyte is composed of an aqueous solution of 1% phosphoric acid and glycol to a concentration of 50% and wherein the anode is anodised at a temperature of 25°C and a current density of 0.1mA cm$^{-2}$.

9. A method as claimed in claim 1 wherein the electrolyte is composed of an aqueous solution of 5% phosphoric acid and wherein the current density of anodisation is in the range 0.1 to 10.0 mA cm$^{-2}$.

10. A tantalum capacitor comprising a tantalum anode having an anodic oxide coating thereon produced by the method as claimed in claim 1.

* * * * *